United States Patent [19]
Morita

[11] Patent Number: 5,493,294
[45] Date of Patent: Feb. 20, 1996

[54] APPARATUS FOR DETECTING THE POSITION OF A VEHICLE

[75] Inventor: Kazuya Morita, Osaka, Japan

[73] Assignee: Sumitomo Electric Industries, Ltd., Osaka, Japan

[21] Appl. No.: 368,759

[22] Filed: Jan. 4, 1995

Related U.S. Application Data

[63] Continuation of Ser. No. 45,600, Apr. 9, 1993, abandoned.

[30] Foreign Application Priority Data

Apr. 15, 1992 [JP] Japan ..................... 4-095672

[51] Int. Cl.$^6$ ................................. G08G 1/123
[52] U.S. Cl. ................ 340/988; 340/990; 364/449
[58] Field of Search ................. 340/988, 993, 340/990, 995; 364/449; 342/457, 357

[56] References Cited

U.S. PATENT DOCUMENTS

| | | | |
|---|---|---|---|
| 4,924,699 | 5/1990 | Kuroda et al. | 340/990 |
| 4,963,865 | 10/1990 | Ichikawa et al. | 340/995 |
| 5,023,798 | 6/1991 | Neukirchner et al. | 340/995 |
| 5,119,301 | 6/1992 | Shimizu et al. | 364/449 |
| 5,220,509 | 6/1993 | Takemura et al. | 364/449 |
| 5,311,173 | 5/1994 | Komura et al. | 340/995 |

FOREIGN PATENT DOCUMENTS

| | | |
|---|---|---|
| 0276366 | 8/1988 | European Pat. Off. . |
| 0393935 | 10/1990 | European Pat. Off. . |
| 3718996 | 12/1988 | Germany . |

*Primary Examiner*—Brent A. Swarthout
*Attorney, Agent, or Firm*—Lane, Aitken & McCann

[57] ABSTRACT

A vehicle position detecting apparatus comprises satellite designating means for designating at least three satellites from a plurality of satellites revolving around the earth to form a designated satellite combination, vehicle position estimating means for estimating a vehicle position on the basis of the vehicle position data supplied from the designated satellite combination and received by electric wave receiving means mounted on the vehicle, satellite combination fixing means for fixing the designated satellite combination to make constant an offset representing a deviation between the estimated vehicle position and a true vehicle position, and true vehicle position calculating means for calculating the true vehicle position on the basis of the offset and the estimated vehicle position. Various errors detected by sensors or means forming part of the vehicle position detecting apparatus can be minimized so as to enhance the accuracy of the vehicle position at a higher level.

3 Claims, 7 Drawing Sheets

| 0 | 0 | 0 | 0 |
|---|---|---|---|
| 0 | 0 | 0 | 0 |
| 0 | 0 | 0 | 0 |
| 0.3 | 0.5 | 0.3 | 0 |

+

| 0 | 0 | 0 | 0.3 |
|---|---|---|---|
| 0 | 0 | 0 | 0 |
| 0 | 0 | 0 | 0 |
| 0.3 | 0.5 | 0.3 | 0 |

→

| 0 | 0 | 0 | 0.3 |
|---|---|---|---|
| 0 | 0 | 0 | 0 |
| 0 | 0 | 0 | 0 |
| 0.3 | 0.5 | 0.3 | 0 |

| 0 | 0 | 0 | 0.3 |
|---|---|---|---|
| 0 | 0 | 0 | 0 |
| 0 | 0 | 0 | 0 |
| 0.3 | 0.5 | 0.3 | 0 |

+

| 0 | 0 | 0 | 0.3 |
|---|---|---|---|
| 0 | 0 | 0 | 0 |
| 0 | 0 | 0 | 0 |
| 0.3 | 0.5 | 0.3 | 0 |

→

| 0 | 0 | 0 | 0.6 |
|---|---|---|---|
| 0 | 0 | 0 | 0 |
| 0 | 0 | 0 | 0 |
| 0.6 | 1.0 | 0.6 | 0 |

| 0 | 0 | 0 | 0.6 |
|---|---|---|---|
| 0 | 0 | 0 | 0 |
| 0 | 0 | 0 | 0 |
| 0.6 | 1.0 | 0.6 | 0 |

+

| 0.1 | 0.2 | 0.3 | 0.3 |
|---|---|---|---|
| 0.2 | 0 | 0 | 0.3 |
| 0.3 | 0 | 0 | 0 |
| 0.3 | 0.5 | 0 | 0 |

→

| 0.1 | 0.2 | 0.3 | 0.9 |
|---|---|---|---|
| 0.2 | 0 | 0 | 0.3 |
| 0.3 | 0 | 0 | 0 |
| 0.9 | 1.5 | 0.6 | 0 |

| 0.1 | 0.2 | 0.3 | 0.9 |
|---|---|---|---|
| 0.2 | 0 | 0 | 0.3 |
| 0.3 | 0 | 0 | 0 |
| 0.9 | 1.5 | 0.6 | 0 |

+

| 0 | 0.2 | 0 | 0 |
|---|---|---|---|
| 0 | 0.5 | 0 | 0 |
| 0 | 0.8 | 0 | 0 |
| 0 | 0.5 | 0 | 0 |

→

| 0.1 | 0.4 | 0.3 | 0.9 |
|---|---|---|---|
| 0.2 | 0.5 | 0 | 0.3 |
| 0.3 | 0.8 | 0 | 0 |
| 0.9 | 2.0 | 0.6 | 0 |

5,493,294

APPARATUS FOR DETECTING THE POSITION OF A VEHICLE

This application is a continuation of prior complete application Ser. No. 08/045,600, filed Apr. 9, 1993, now abandoned.

FIELD OF THE INVENTION

The present invention relates to a vehicle position detecting apparatus, and more specifically to a vehicle position detecting apparatus employing a global positioning system so as to detect the accurate position of a vehicle.

DESCRIPTION OF THE PRIOR ART

There have been so far proposed a wide variety of methods each of which is effected with a direction sensor and a distance sensor for deriving the travel path of a vehicle. The above method of deriving the travel path of the vehicle is called a "dead reckoning method" since the position of the vehicle is detected by the direction and distance sensors mounted thereon. The vehicle position detecting apparatus employing the above method is relatively easily mounted on the vehicle, resulting from no need of external assisting facilities. However, the direction and distance sensors entail errors in response to the travel distance increased, thereby causing the errors of the position detection to be accumulated.

There has been proposed a map matching method which can reduce such accumulated errors of the position detection by matching the patterns between the road network data and the travel paths derived by the direction and distance sensors. Such a vehicle position detecting apparatus employing the map matching method is disclosed in, for example, Japanese patent laid-open publication Nos. 63-148115, 63-115004, and 64-53112.

However, the above vehicle position detecting apparatus encounters such difficulties that position errors calculated by the dead reckoning method can not be corrected by referring the map for detection of the precise position of the vehicle if the road network data is outdated and thus inaccurate and the road network is of complicated patterns and minute lattices. This creates another problem in that a driver recognizes a wrong road in lieu of a correct road during driving his vehicle. Once the driver misreads the vehicle position, a long time is needed for recovering the precise position of the vehicle. For this reason, someone might propose enhancement for the accuracy of the road network data, however, another difficulty such as the abrupt increase of work force and cost for production of the road network data. To enhance the reliability of the map matching method is another task for those skilled in the art. For example, another vehicle position detecting apparatus is proposed as disclosed in Japanese patent laid-open publication No. 2-275310. The above vehicle position detecting apparatus is designed to use a global positioning system (hereinlater simply referred to as "GPS") for detecting the absolute position of the vehicle so as to correct the vehicle position derived by the foregoing map matching method on the basis of the vehicle position derived from the GPS, thereby enhancing the map matching method. The GPS is a system for detecting the vehicle position on the basis of electric waves transmitted from man-made satellites (hereinlater simply referred to as "GPS satellites"). More specifically, the electric waves are transmitted from three or more satellites revolving around their predetermined orbits to a GPS receiver mounted on the vehicle. The GPS receiver calculates the propagated delay times of the electric waves from the respective satellites to the GPS receiver of the vehicle so as to detect the two or three dimensional position of the vehicle on the basis of distances between the respective satellites and the GPS receiver. That is, the two or three dimensional position detection needs respectively three GPS satellites or four GPS satellites.

The vehicle position detecting apparatus using the foregoing GPS searches for map data containing the vehicle position detected by the GPS to detect a most probable position from the map data as a real vehicle position. If, however, the vehicle position detected by the GPS has a large error scope in which a plurality of roads are positioned, it is almost impossible to determine on which road is the vehicle traveling. At the present time, the number of satellites revolving around the earth is 17 but will be increased in the near feature. For example, three or four satellites are designated from eight satellites positioned at the points #1–#8 illustrated in FIG. 6 so as to form an optimum designated satellite combination which is appropriately and automatically varied depending upon conditions. The electric waves from the optimum designated satellite combination are received by the GPS for detecting the vehicle position. As shown in FIG. 7, the position output from the GPS includes a so-called offset OS which is a deviation between the vehicle position PG derived by the GPS and the true vehicle position P and an ellipse error RE determined on the basis of an arrangement of the designated satellites. The offset OS and the ellipse error RE are varied in response to the designated satellite combination. If another designated satellite combination is selected from the eight satellites while the most probable positions respectively corresponding to the positions which are derived by the GPS during a certain period of time are being calculated as the real vehicle positions with reference to the searched map data containing the positions derived by the GPS, the calculated positions entail an additional error. As shown in FIG. 8, the offsets OS corresponding to the vehicle positions PG derived from a certain designated satellite combination are always constant. If, however, the designated satellite combination is changed to another satellite combination at a position X during the position detection by the GPS as shown in FIG. 9, the offsets OS corresponding to the vehicle positions PG derived by the GPS are abruptly varied at the position X. For this reason, it is incorrectly recognized that the vehicle travels on a path illustrated as a dotted line connecting the derived positions PG when the vehicle is really on the road R. In addition, it is impossible to forecast a time when the designated satellite combination is changed, i.e., when the offset is varied. If, accordingly, the designated satellite combination is changed in a short cycle, plenty of data can not be obtained, thereby making it difficult to detect the precise position of the vehicle.

The present invention has been made to overcome the foregoing difficulties in the prior art, and the object of the present invention is to provide a vehicle position detecting apparatus which keeps uniformly the offset and makes it possible to cause the error of the position detection to be minimized and enhances the accuracy of the position detection.

SUMMARY OF THE INVENTION

The foregoing object of the present invention can be achieved by providing an apparatus for detecting the position of a vehicle, comprising: electric wave receiving means for receiving electric waves from a plurality of satellites revolving around the earth to supply the vehicle position data, satellite designating means for designating at least three satellites from the plurality of satellites to form a designated satellite combination, vehicle position estimating means for estimating a vehicle position on the basis of the vehicle position data supplied from the designated satellite combination and received by the electric wave receiving means, said estimated vehicle position including a position error are symmetrically surrounding the estimated vehicle position satellite combination fixing means for fixing the designated satellite combination to make constant an offset representing a deviation between the estimated vehicle position and a true vehicle position, road network data storing means for storing road network data having a plurality of road network patterns, estimated table making means for dividing the position error area into a plurality of mesh sections, for determining the value of the probability of vehicle existence in each mesh section of the position error area and making an estimated table containing estimated values each corresponding to each of the determined values of the probability in all mesh sections of the position error area, repeating means for repeating as the vehicle travels the operation of the estimated table making means at intervals under the condition that the designated satellite combination is fixed by the satellite combination fixing means, table updating means for updating a previously updated estimated table having previously updated estimated values each time the estimated table is made by the estimated table making means, by adding the estimated values of the estimated table to the previously updated estimated values, respectively, of the previously updated estimated table, deviation calculating means for calculating a deviation between the estimated vehicle position and a position of the position error area specified by a largest value within the updated estimated values of the updated estimated table, the deviation being indicative of the offset, and true vehicle position calculating means for calculating the true vehicle position on the basis of the offset and the estimated vehicle position.

BRIEF DESCRIPTION OF THE DRAWINGS

The features and advantages of a vehicle position detecting apparatus proposed by the present invention will be more clearly understood from the following description take in conjunction with the accompanying drawings in which:

FIGS. 4(a) to 4(d) are explanatory illustrations showing processes of making updated estimated tables;

DESCRIPTION OF THE PREFERRED EMBODIMENTS

An embodiment of a vehicle position detecting apparatus according to the present invention will be hereinafter described with reference to FIGS. 1 to 8 of the drawings.

Figure 1:
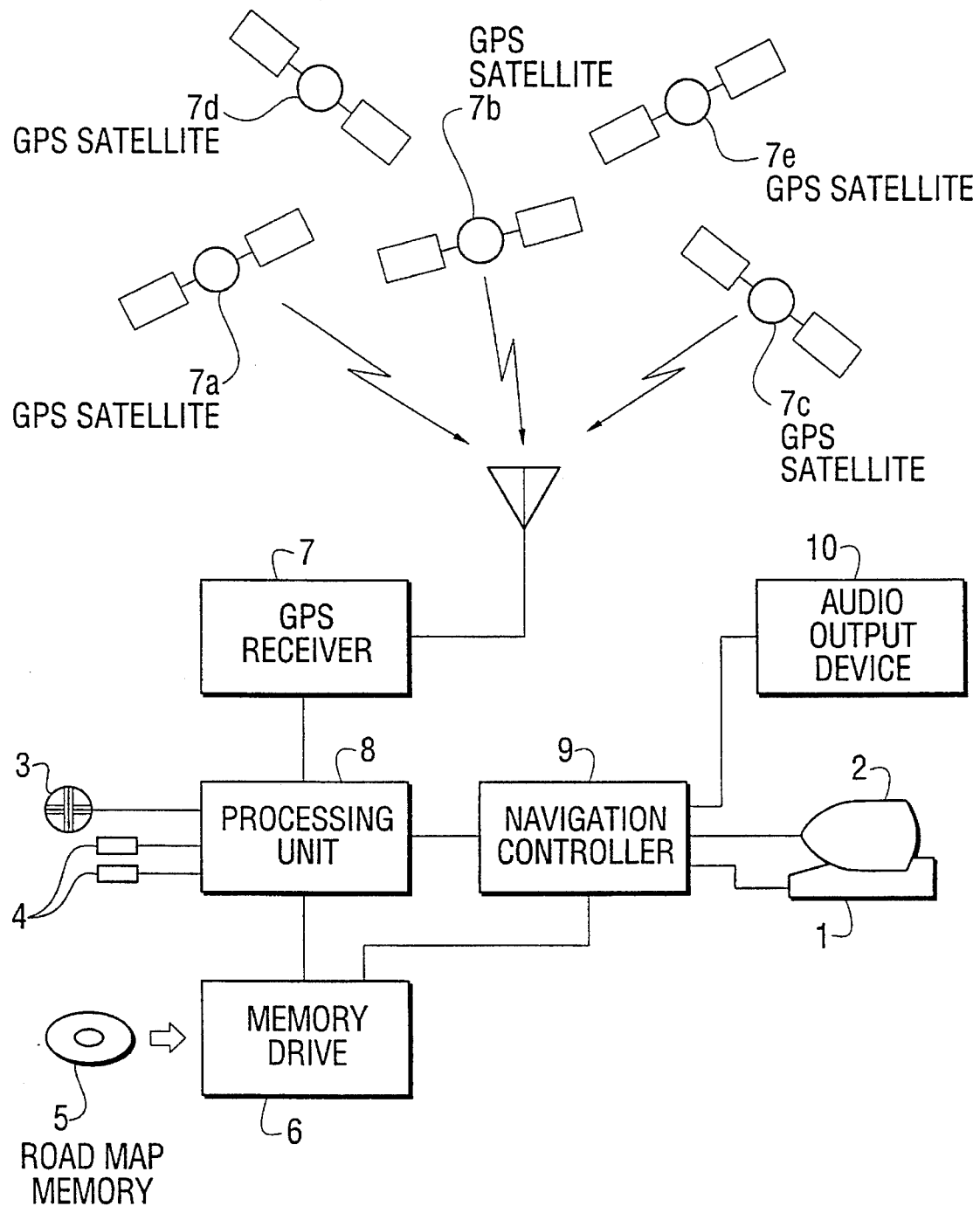
FIG. 1 is a schematic block diagram of a vehicle position detecting system including a preferred embodiment of a vehicle position detecting apparatus according to the present invention.

The vehicle position detecting apparatus according to the present invention is shown in FIG. 1 as comprising a console 1, a display unit 2 having a screen, a direction sensor 3, a d i stance sensor 4, a road map memory 5, a memory drive 6, a GPS receiver 7, a processing unit 8, a navigation controller 9 and an audio output device 10. The console 1 comprises a keyboard for entry of start and stop signals to the processing unit 8. The display unit 2 comprises a cathode-ray tube (CRT) or a liquid crystal display unit having a transparent touch panel on the screen thereof for representing a menu supplied from the navigation controller 9, so that the driver can touch the touch panel on the display unit 2 to enter various kinds of road maps, the magnifying power of the map, the destination and so forth. The display unit 2 serves to interface between the driver and the navigation controller 9. The direction sensor 3 comprises a geomagnetic sensor, a gyro, a turning angular velocity sensor and the like for detecting the variation of the travel direction of the vehicle. The turning velocity sensor is designed to detect a turning angle on the basis of difference between the revolutions of right and left wheels. The distance sensor 4 comprises a wheel sensor, a wheel speed sensor, or the like for detecting the distance on the basis of the travel speed of the vehicle and the revolution of the wheel. The road map memory 5 comprises a large capacity memory medium such as a CD-ROM (Compact Disc of Read Only Memory), a magnetic tape or the like for memorizing the map data having many graphically displayed maps divided into mesh-like form. On the display unit 2 is displayed the map data including many maps each divided into a plurality of mesh units each having road types and coordinate positions represented in a graphically displaying fashion. The road map memory 5 has memorized therein road network data for matching the maps at each of the mesh units. The road network data comprises data combining nodes indicative of junctions and links indicative of road segments, data indicative of the distances of the links, data indicative of the time periods required for traveling the full distances the links, data indicative of discriminating the sorts of roads (highways, trunk lines, streets, etc.), data indicative of road widths, point data indicative of identifying cities, towns, villages, famous facilities, conspicuous points on the railways. The map data to be displayed on the display 2 comprises a plurality of maps different in a reduced scale in response to the measurements of the divided mesh units in the road map. The memory drive 6 functions to read out the data from the road map memory 5. The GPS receiver 7 is designed to record pseudo-noise cords received from a certain satellite combination constituted by three or four satellites for measurement of electric wave delay times from those satellites and for calculating the position of the vehicle on the earth. More specifically, the GPS receiver 7 receives radio electric waves from satellites 7a, 7b and 7c designated from satellites 7a to 7e revolving on their orbits. The processing unit 8 derives the vehicle position on the basis of position data received by GPS receiver 7 and correct the vehicle position to detect the true vehicle position on a vehicle traveling road. In addition, the processing unit 8 compares the true vehicle position and the road network data obtained by the road map memory 5. The navigation controller 9 performs various calculations and controls including calculations of guiding paths, references and reading-outs of road maps in the predetermined range, makings of the displaying data for guiding the driver, operations of the display 2 and the audio output device 10, and controls of the processing unit 8.

Specifically, the processing unit 8 has functions for forming a satellite combination, estimating a vehicle position, making a provisional estimated table, making an updated estimated table, deriving an offset, detecting the true vehicle position, integrating outputs of travel distance and direction sensors, and matching the detected true vehicle positions and the road network data.

In the function for designating satellites, the processing unit 8 designates three or four GPS satellites from a plurality of GPS satellites around the earth so as to form a designated satellite combination used for detecting the vehicle position. The designated satellite combination is fixed until the true vehicle position is detected, thereby making it possible to make an offset constant. The vehicle existence probability distribution means probabilities that the vehicle exists in a predetermined area extending around the following estimated vehicle position, and the offset represents a deviation between the following estimated vehicle position and the following true vehicle position.

In the function for estimating a vehicle position, the processing unit 8 estimates and stores a vehicle position on the basis of the vehicle position data, i.e., propagated delay times of electric waves supplied from the fixed satellite combination and received by the receiver 7.

In the function for making a estimated table, the processing unit 8 obtains a road network pattern in the predetermined map area from the road map memory 5. The estimated vehicle position and the vehicle existence probability area are indicated on the road network patterns. The road network pattern is overlaid by a mesh pattern having 16 (4×4) mesh sections divided therein in such a manner that the estimated vehicle position is indicated on the road network pattern and is positioned at the center of the mesh pattern. Then, the processing unit 8 determines the value of probability that the vehicle exists in each of the mesh sections of the mesh pattern on the basis of the vehicle existence probability distribution, and makes a provisional estimated table containing provisional estimated values each corresponding to each of the determined probability values in all mesh sections of the mesh pattern.

In the function for updating the previously updated estimated table, the processing unit 8 updates the previously updated estimated table, each time the estimated table is made, by adding the estimated values of the estimated table to the previously updated estimated values, respectively, of the previously updated estimated table.

In the function for deriving an offset value, the processing unit 8 calculates a deviation between a mesh section of the vehicle existence probability area specified by a largest value within the estimated values of the updated table and the estimated vehicle position so as to recognize the deviation as an offset.

In the function for detecting a true vehicle position, the processing unit 8 calculates a true vehicle position on the basis of the offset and the estimated vehicle position.

In the function for integrating outputs of travel distance and direction sensors, the processing unit 8 integrates the vehicle travel distance detected by the distance sensor 4, while integrating the amount of the travel direction changes detected by the direction sensor 3.

In the function for matching detected true vehicle positions and road network data, the processing unit 8 matches the true vehicle positions and road network data stored by road map memory 5 in consideration of the aforementioned integrated data.

Figure 2:
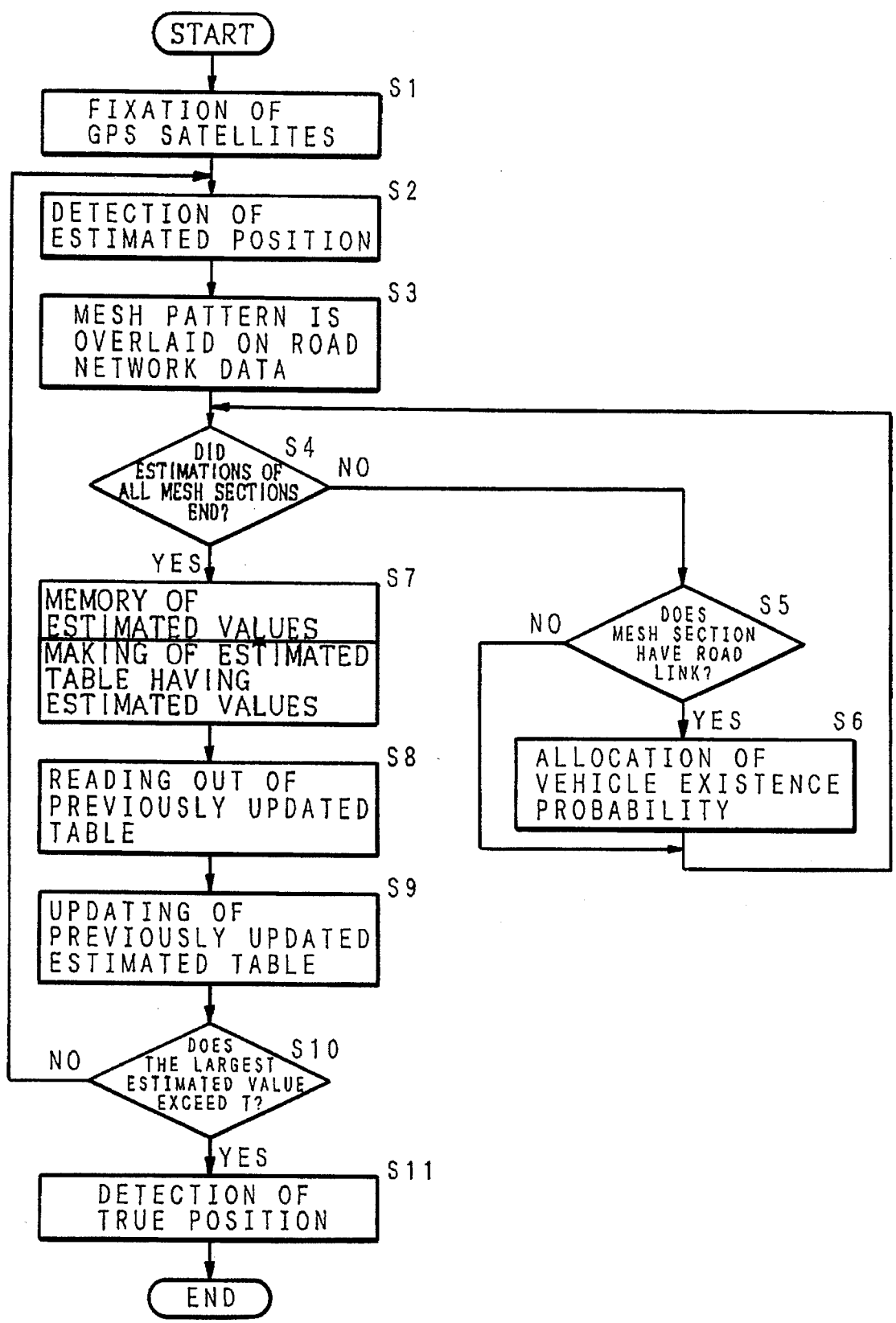
FIG. 2 is a flowchart of the process performed by the preferred embodiment of the vehicle position detecting apparatus illustrated in FIG. 1.

The process of detecting the vehicle position by the aforementioned vehicle position detecting apparatus will be described hereinafter by a flowchart shown in FIG. 2.

In a step S1 after the process is started, three or four satellites are designated for detecting the vehicle position so as to form and fix a designated satellite combination. In a step S2, the vehicle position is detected on the basis of propagated delay times of the electric waves supplied from the designated satellite combination fixed in the step S1 and received by the GPS receiver 7. In a step S3, a road network pattern in the predetermined area obtained from the road map memory 5 is overlaid by a mesh pattern having a plurality of mesh sections and as a consequence the vehicle existence probability area is divided into a plurality of mesh sections to estimate the value of the probability of the vehicle existence in each mesh section of the vehicle existence probability area. If, in a step 4, the vehicle existence probability values are not estimated in all mesh sections of the vehicle existence probability area, "NO" is selected to make the process to advance to a step S5. In the step S5, determination is made on whether or not one or more links indicative of road segments are situated in a mesh section of a mesh pattern. If the mesh section has one or more the links, "YES" is selected to make the process to go to a step S6. In the step S6, a value of existence probability such as for example "0.5" derived based on the probability distribution within the vehicle existence probability area is allocated to the mesh section as seen from FIG. 5(a). Then, control returns to step 4 from the step 6. If, on the other hand, a mesh section having no link is situated, "NO" is selected to make the step S5 return to the step S4. In the step S4, if the values of the vehicle existence probability are estimated in all mesh sections of the mesh pattern, "YES" is selected to advance the process to a step S7. In the step S7, each of the values of the vehicle existence probability allocated as estimated values to each of the mesh sections is stored in a memory so as to make a estimated table. In a step S8, a previously updated estimated table having previously updated estimated values is read out from the memory. In a step S9, each of the estimated values of the estimated table made in the step S7 is added to each of the previously updated estimated values of the previously updated estimated table read out in the step S8, thereby updating the estimated table. In other words, an updated estimated table is made in the step S9. In a step S10, determination is made on whether or not the largest estimated value appearing in the updated estimated table exceeds a predetermined standard value T, for example, "1.7." If the largest estimated value does not exceed the predetermined standard value T, "NO" is selected to make the step S10 return to the step S2 so as to repeat the steps S2 to S10. If, on the other hand, the largest estimated value exceeds the predetermined standard value T, "YES" is selected to make the process go to a step S11. In the step S11, a deviation between the mesh section having the largest estimated value exceeding the predetermined standard value T in the step S10 and the vehicle position detected by the GPS is calculated and recognized as an offset. Then, on the basis of the offset and the vehicle position detected in the step S2 a true vehicle position is calculated and detected.

Figure 3:
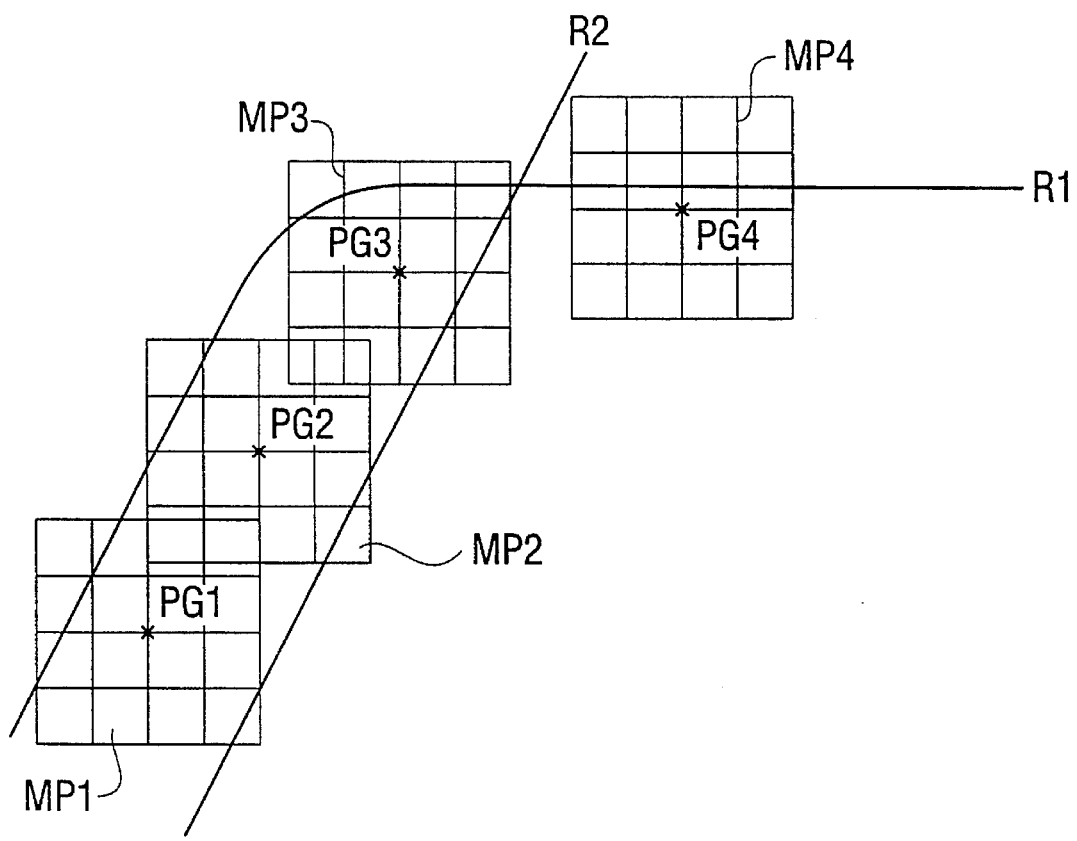
FIG. 3 is an explanatory illustration showing a road network pattern with the vehicle position in the center of each of the mesh patterns.
Figure 5A:
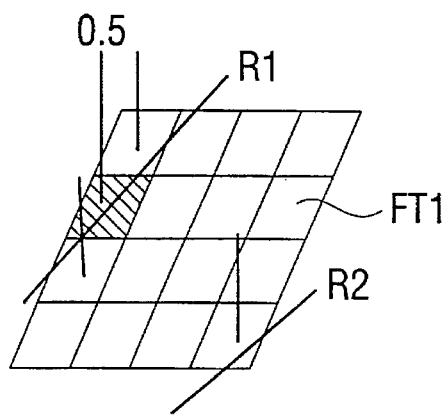
FIGS. 5(a) to 5(d) are explanatory illustrations showing estimated values obtained from the updated estimated tables and allocated to the mesh sections of each of the mesh patterns.

For easily understanding above-mentioned process of the true position detection, it will be described with reference to FIGS. 3 to 5. FIG. 3 shows a road network pattern and mesh patterns overlaid on the road network patterns with a vehicle position at the center of each of the mesh patterns. FIG. 4 indicates processes of making the updated estimated tables. FIG. 5 indicates the estimated values obtained from the updated estimated tables and allocated to the mesh sections of the mesh patterns. For example, it i s assumed that the vehicle travels in an area covering roads R1 and R2 shown in FIG. 3. Firstly, the designated satellite combination is fixed by the processing unit 8, and then a vehicle position PG1 is derived from the GPS receiver 7. A mesh pattern MP1 is overlaid on a road network pattern of a certain map area obtained from the road map memory 5 in such a manner that the vehicle position PG1 is positioned at the center of the mesh pattern MP1. Values of the vehicle existence probability respectively corresponding to the mesh sections of the mesh pattern are estimated on the basis of the vehicle existence probability distribution in a region covering the vehicle position PG1, thereby making a estimated table ST1. The shape of the aforementioned vehicle existence probability distribution is based on, for example, a two-dimensional Gaussian distribution curve. As will be seen in FIG. 4(a), a estimated table PT1 obtained from the map area for which the table ST1 is previously made is read out. In this embodiment, all estimated values of the table PT1 are "0", since there is no estimated table made before the estimated table ST1. Then, the estimated values of the table PT1 are respectively added to the estimated values of the estimated table ST1, thereby making an updated estimated table FT1 which has an estimated value distribution on the mesh pattern corresponding to the table FT1 as shown in FIG. 5(a). From the estimated value distribution of the updated estimated table FT1 in FIG. 5(a), a mesh section (illustrated by an oblique line area) having the largest estimated value is determined. This largest estimated value of "0.5" does not exceed the predetermined standard value "1.7", whereupon another vehicle position PC2 is derived from the GPS receiver 7.

Figure 5B:
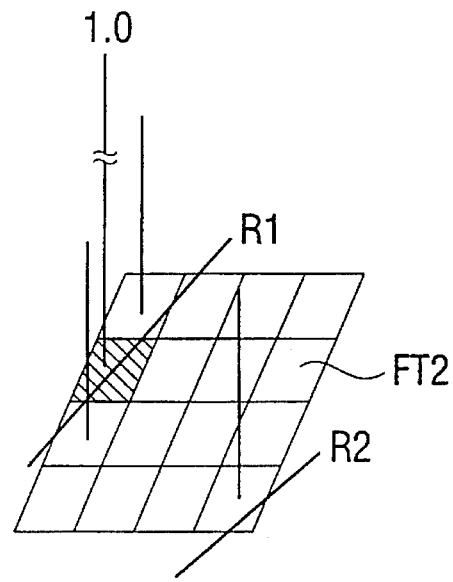

As shown in FIG. 3, another mesh pattern MP2 is similarly overlaid on the road network pattern in the aforementioned map area in such a manner that the vehicle position PG2 is positioned at the center of the mesh pattern MP2. Another provisional estimated table ST2 is made similarly in the method of making the foregoing estimated table ST1. As shown in FIG. 4(b), the estimated values of the estimated table ST2 are respectively added to estimated values of a previously made table PT2 (same as the estimated table FT1) derived in the map area (illustrated in FIG. 3) in which the estimated table ST1 was derived, thereby making an updated estimated table FT2 which has an estimated value distribution on the mesh pattern corresponding to the table FT2 as shown in FIG. 5(b). From the estimated value distribution of the updated estimated table FT2 in FIG. 5(b), a mesh section (illustrated by an oblique line area) having the largest estimated value "1.0" is derived. This largest estimated value "1.0" does not exceed the predetermined standard value "1.7", whereupon a further vehicle position PC3 is derived from the GPS receiver 7.

Figure 5C:
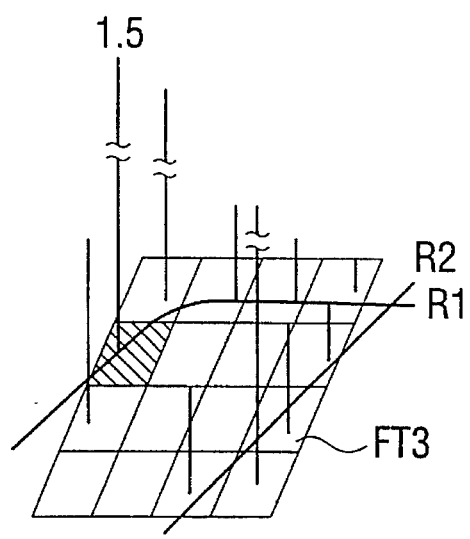

As shown in FIG. 3, a further mesh pattern MP3 is similarly overlaid on the road network pattern in the aforementioned map area in such a manner that the vehicle position PC3 is positioned at the center of the mesh pattern MP3. A further estimated table ST3 is made similarly in the method of making the foregoing estimated tables ST1 and ST2. As shown in FIG. 4(c), the estimated values of the estimated table ST3 are respectively added to estimated values of a previously made table PT3 (same as the estimated table FT2) derived in the map area where the estimated table ST2 was derived, thereby making an updated estimated table FT3 which has an estimated value distribution on the mesh pattern corresponding to the table FT3 as shown in FIG. 5(c). From the estimated value distribution of the updated estimated table FT3 in FIG. 5(c), a mesh section (illustrated by an oblique line area) having the largest estimated value "1.5" is derived. This largest estimated value "1.5" does not exceed the predetermined standard value "1.7", whereupon a yet further vehicle position PG4 is derived from the GPS receiver 7.

Figure 5D:
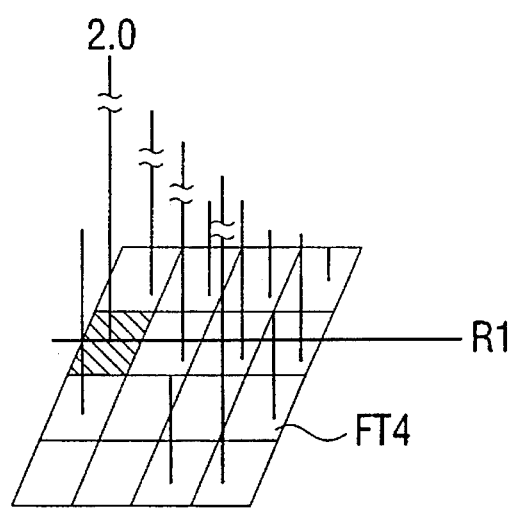
Figure 6:
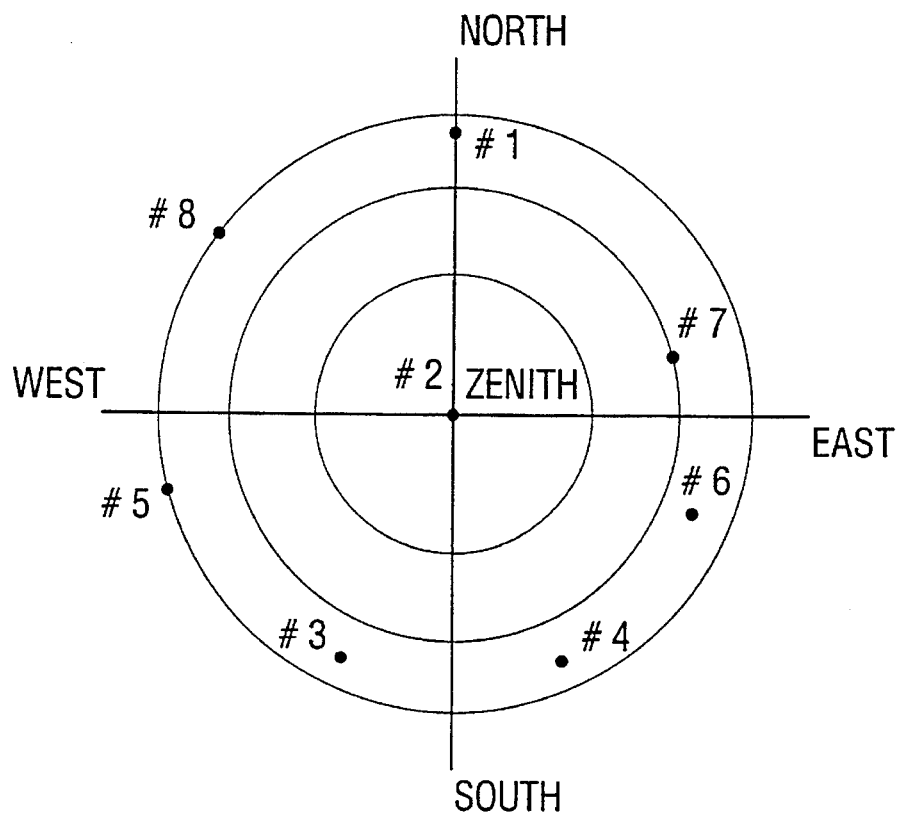
FIG. 6 is an explanatory illustration showing an example of an arrangement of man-made satellites.
Figure 7:
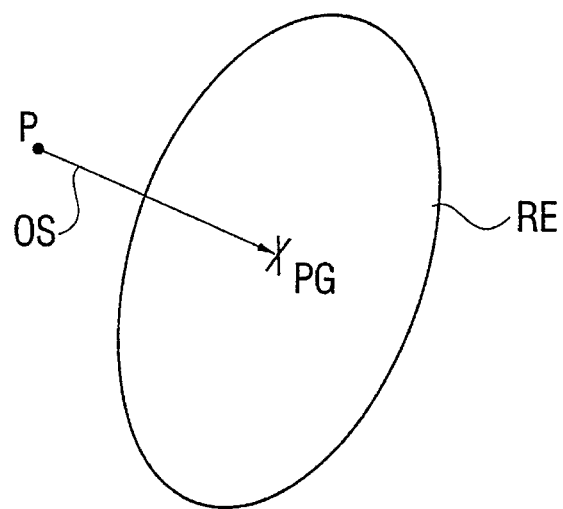
FIG. 7 is an explanatory illustration showing an offset OS between an estimated vehicle position PG derived by GPS and a true vehicle position, and relation between the estimated vehicle position PG and an ellipse error RE.
Figure 8:
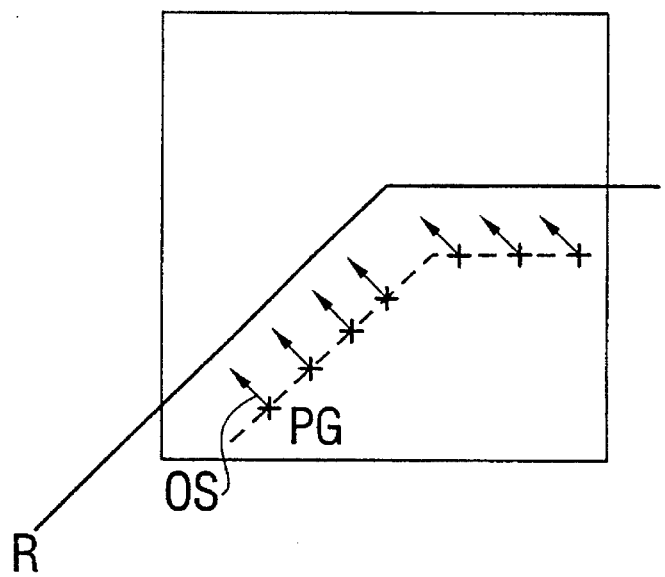
FIG. 8 is an explanatory illustration showing estimated vehicle positions PG derived from a certain designated satellite combination from the GPS in a certain period of time and constant offsets OS each corresponding to each of the estimated vehicle positions PG.
Figure 9:
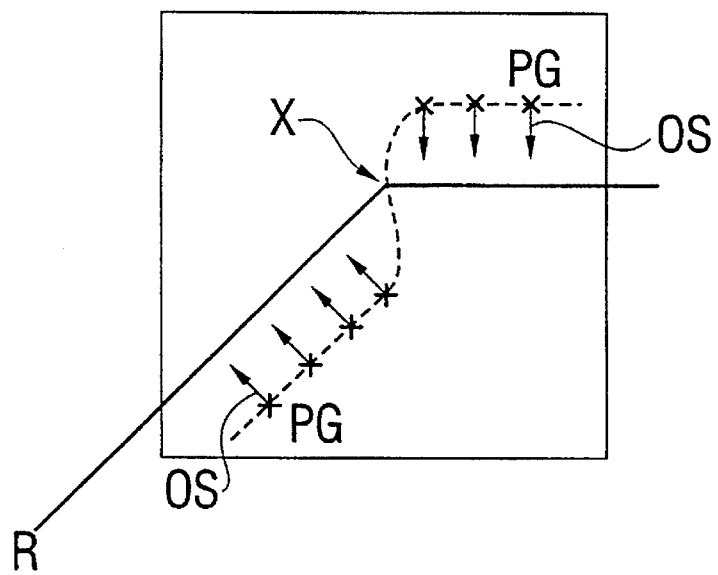
FIG. 9 is an explanatory illustration showing estimated vehicle positions PG derived from the GPS before and a certain designated satellite combination is changed to another satellite combination during detection of the estimated vehicle positions PG.

As shown in FIG. 3, a yet further mesh pattern MP4 is similarly overlaid on the road network pattern in the aforementioned map area in such a manner that the vehicle position PG4 is positioned at the center of the mesh pattern MP4. A yet further estimated table ST4 is made similarly in the method of making the foregoing estimated tables ST1 to ST3. As shown in FIG. 4(d), the estimated values of the estimated table ST4 are respectively added to estimated values of a previously made table PT4 (same as the estimated table FT3) derived in the map area where the estimated table ST3 was derived, thereby making an updated estimated table FT4 which has an estimated value distribution on the mesh pattern corresponding to the table FT4 as shown in FIG. 5(d). From the estimated value distribution of the updated estimated table FT4 in FIG. 5(d), a mesh section (illustrated by an oblique line area) having the largest estimated value "2.0" is derived. When the largest estimated value "2.0" exceeds the predetermined standard value "1.7", the position of the vehicle on the road link appearing in the mesh section having the largest estimated value "2.0" is detected as the true vehicle position.

As described above, a mesh pattern is overlaid on a road network pattern of a certain map area obtained from the road map memory 5 in such a manner that the vehicle position derived by the GPS is positioned at the center of the mesh pattern. Values of the vehicle existence probability in the mesh sections of the mesh pattern are estimated on the basis of the vehicle existence probability distribution in a region covering the vehicle position at the center thereof and stored, thereby making the estimated table in the mesh pattern. The estimated values of the estimated table are respectively added to the estimated values of the previously estimated table obtained from the map area where the present estimated table was derived, so as to make an updated estimated table. The offset indicating the deviation between the mesh section having the largest estimated value of the updated estimated table and the vehicle position derived by the GPS is always constant with respect to the true vehicle position. This results from the fact that the designated satellite combination used for detecting the vehicle position is being fixed until the true vehicle position is detected. Consequently, the true vehicle positions detected on the basis of the aforementioned offset and the vehicle positions derived from the GPS are excessively accurate. In other words, the vehicle positions derived from the GPS are corrected and varied to updated positions on the links in the mesh sections of the mesh patterns each having a highest probability, thereby specifying precisely road links and points thereon. Additionally, in this embodiment, the vehicle travel distance detected by the distance sensor 4 and the amount of the travel direction changes detected by the direction sensor 3 are integrated simultaneously with the detection of the vehicle position. The detected true vehicle positions and the road network data stored by road map memory 5 are matched in consideration of these integrated data, thereby making it possible to precisely detect the vehicle position.

It will be understood by those skilled in the art that the foregoing description is in terms of preferred embodiment of the present invention wherein various changes and modification may be made without departing from the spirit and scope of the invention, as set forth in the appended claims.

What is claimed is:

1. An apparatus for detecting the position of a vehicle, comprising:

electric wave receiving means for receiving electric waves from a plurality of satellites revolving around the earth to supply vehicle position data;

satellite designating means for designating at least three satellites from said plurality of satellites to form a designated satellite combination;

vehicle position estimating means for estimating an estimated vehicle position on the basis of said vehicle position data supplied from said designated satellite combination and received by said electric wave receiving means, said estimated vehicle position including a position error area symmetrically surrounding the estimated vehicle position;

satellite combination fixing means for fixing said designated satellite combination to make constant an offset representing a deviation between said estimated vehicle position and a true vehicle position;

road network data storing means for storing road network data having a plurality of road network patterns, said estimated vehicle position and said position error area being indicated on said road network patterns;

estimated table making means for dividing said position error area into a plurality of mesh sections, for determining a value of the probability of the vehicle existence in each mesh section of said position error area and making an estimated table containing estimated values each corresponding to each of the determined values of the probability in all mesh sections of said position error area;

repeating means for repeating, as the vehicle travels, the operation of said estimated table making means at intervals under the condition that said designated satellite combination is fixed by said satellite combination fixing means;

table updating means for updating a previously updated estimated table having previously updated estimated values each time said estimated table is made by said estimated table making means, by adding the estimated values of the estimated table to the previously updated estimated values, respectively, of the previously updated estimated table;

deviation calculating means for calculating a deviation between said estimated vehicle position and the position of a mesh section of said position error area specified by a largest value within the updated estimated values of said updated estimated table, said deviation being indicative of said offset; and true vehicle position calculating means for calculating the true vehicle position on the basis of said offset and said estimated vehicle position.

2. An apparatus as set forth in claim 1, in which the calculating said deviation by said deviation calculating means is performed when the largest updated estimated value of said updated table exceeds a predetermined value.

3. An apparatus as set forth in claim 1, which further comprises:

direction detecting means for detecting the travel direction of said vehicle;

distance detecting means for detecting the travel distance of said vehicle; and vehicle position determining means for determining the real present vehicle position on travel roads on the basis of said travel direction detected by said direction detecting means, said travel distance detected by said distance detecting means, said true vehicle positions calculated by said true vehicle position calculating means, and said road network data stored by said road network data storing means.

* * * * *